US008444836B2

(12) United States Patent
Fouillet et al.

(10) Patent No.: US 8,444,836 B2
(45) Date of Patent: May 21, 2013

(54) MICRODEVICE FOR TREATING LIQUID SAMPLES

(75) Inventors: Yves Fouillet, Voreppe (FR); Laurent Davoust, Requeil (FR)

(73) Assignees: Commissariat a l'Energie Atomique, Paris (FR); Centre National de la Recherche Scientifique, Paris (FR)

( * ) Notice: Subject to any disclaimer, the term of this patent is extended or adjusted under 35 U.S.C. 154(b) by 433 days.

(21) Appl. No.: 12/518,007

(22) PCT Filed: Dec. 3, 2007

(86) PCT No.: PCT/EP2007/063178

§ 371 (c)(1), (2), (4) Date: Jun. 5, 2009

(87) PCT Pub. No.: WO2008/068229

PCT Pub. Date: Jun. 12, 2008

(65) Prior Publication Data

US 2010/0320088 A1 Dec. 23, 2010

(30) Foreign Application Priority Data

Dec. 5, 2006 (FR) ..................................... 06 55327

(51) Int. Cl.
*G01N 27/26* (2006.01)
*B01F 3/08* (2006.01)
*B01F 5/10* (2006.01)

(52) U.S. Cl.
USPC ........... 204/450; 204/400; 204/454; 204/547; 204/600; 204/643; 359/271

(58) Field of Classification Search .................. 204/450, 204/400, 454, 547, 600, 643; 359/271
See application file for complete search history.

(56) References Cited

U.S. PATENT DOCUMENTS

| | | | |
|---|---|---|---|
| 6,545,815 B2 * | 4/2003 | Kroupenkine et al. | 359/665 |
| 6,565,727 B1 | 5/2003 | Shenderov | |
| 7,147,763 B2 * | 12/2006 | Elrod et al. | 204/547 |
| 2003/0183525 A1 | 10/2003 | Elrod et al. | |
| 2005/0064603 A1 | 3/2005 | Ginot et al. | |
| 2005/0181367 A1 | 8/2005 | Berthier et al. | |
| 2006/0108224 A1 * | 5/2006 | King et al. | 204/450 |
| 2006/0132542 A1 * | 6/2006 | Bruyker et al. | 347/48 |

FOREIGN PATENT DOCUMENTS

| | | |
|---|---|---|
| FR | 2 829 576 A1 | 3/2003 |
| JP | 2004-000935 | 1/2004 |
| WO | WO 2005/047696 A1 | 5/2005 |

OTHER PUBLICATIONS

Miraghaie et al. (NSTI-Nanotech 2006, vol. 2, 610-613).*
Lin et al. (Langmuir, 2006, 22, 484-489).*

(Continued)

*Primary Examiner* — J. Christopher Ball
*Assistant Examiner* — Jennifer Dieterle
(74) *Attorney, Agent, or Firm* — Oblon, Spivak, McClelland, Maier & Neustadt, L.L.P.

(57) ABSTRACT

A device for forming at least one circulating flow, or vortex, at the surface of a drop of liquid, including at least two first electrodes forming a plane and having edges facing each other, such that the contact line of a drop, deposited on the device and fixed relatively to the device, has a tangent forming, when projected onto the plane of the electrodes, an angle between 0° and 90° with the edges facing each other of the electrodes.

14 Claims, 8 Drawing Sheets

OTHER PUBLICATIONS

Jean-Paul Behr, et al., „Efficient Gene Transfer into Mammalian Primary Endocrine Cells with Lipopolyamine-Coated DNA, Proc. Natl. Acad. Sci. USA, vol. 86, Sep. 1989, pp. 6982-6986.

Antoni Castellanos, "Electrohydrodynamics", Springer, CISM Courses and Lectures, No. 380, 1998, pp. 42-61.

James L. Cole[a], et al., "Analytical Ultracentrifugation as a Contemporary Biomolecular Research Tool", Journal of Biomolecular Techniques, vol. 10, Issue 4, Dec. 1999, pp. 163-176.

Joseph M. Crowley, et al., "Selecting a Working Fluid to Increase the Efficiency and Flow Rate of an EHD Pump", IEEE Transactions on Industry Applications, vol. 26, No. 1, Jan./Feb. 1990, pp. 42-49.

J. Darabi, et al., "An Electrohydrodynamic Polarization Micropump for Electronic Cooling", Journal of Microelectromechanical Systems, vol. 10, No. 1, Mar. 2001, pp. 98-106.

L. Davoust, et al., "Ageing of Gas/Liquid Interface Elongated by Standing Waves", Colloids and Surfaces A: Physicochem. Eng. Aspects, 270-271, 2005, pp. 182-188.

Pierre-Gilles de Gennes, "Ultradivided Matter", Nature, 412, 2001, p. 385.

Nathalie Fraysse, et al., "An Experimental study of Rivulet Instabilities in Centrifugal Spin Coating of Viscous Newtonian and Non-Newtonian Fluids", Phys. Fluids, 6, (4), Apr. 1994, pp. 1491-1504.

Farid J. Ghadessy, et al., "Directed Evolution of Polymerase Function by Compartmentalized Self-Replication", PNAS, vol. 98, No. 8, Apr. 10, 2001, pp. 4552-4557.

R. R. Huilgol, et al., "Fluid Mechanics of Viscoelasticity", Elsevier, General Principles, Constitutive Modelling, Analytical and Numerical Techniques, 1997, 10 pages.

Kwan Hyoung Kang, "How Electrostatic Fields Change Contact Angle in Electrowetting", Langmuir, vol. 18, No. 26, 2002, pp. 10318-10322.

Martin U. Kopp, et al., "Chemical Amplification: Continuous-Flow PCR on a Chip", Science, vol. 280, May 15, 1998, pp. 1046-1048.

T. M. Laue, et al., "Modern Applications of Analytical Ultracentrifugation", Annual Rev. Biophys. Biomol. Struct., 28, 1999, pp. 75-100.

Jacob Lebowitz, et al., "Modern Analytical Ultracentrifugation in Protein Science: A Tutorial Review", Protein Science, 11, 2002, pp. 2067-2079.

Ralf Lenigk, et al., "Surface Characterization of a Silicon-Chip-Based DNA Microarray", Langmuir, vol. 17, No. 8, 2001, pp. 2497-2501.

James R. Melcher, "Traveling-Wave Induced Electroconvection", The Physics of Fluids, vol. 9, No. 8, Aug. 1966, pp. 1548-1555.

J. R. Melcher, et al., "Electrohydrodynamics: A Review of the Role of Interfacial Shear Stresses", Annu. Rev. Fluid Mech., 1,1969, pp. 111-146.

G. Marrazza, et al., "Disposable DNA Electrochemical Sensor for Hybridization Detection", Biosensors Bioelectronics, 14, 1, 1999, pp. 43-51.

Frieder Mugele, et al., "Electrowetting: From Basics to Applications", Institute of Physics Publishing, Journal of Physics: Condensed Matter, 17, 2005, R705-R774.

Gabriela P. Saborlo, et al., "Sensitive Detection of Pathological Prion Protein by Cyclic Amplification of Protein Misfolding", Letters to Nature, Nature, vol. 411, 2001, pp. 810-813.

D. A. Saville, "Electrohydrodynamics: The Taylor-Melcher Leaky Dielectric Model", Annual Rev Fluid Mech., 29, 1997, pp. 27-64.

Daphné L. Thomas, et al., "Development of a Fluid Functionalized Lipidic Matrix Applied to Direct in Situ Polynucleotide Detection", Biosensors Bioelectronics 20, 2005, pp. 1539-1548.

C. Picard, et al., "Optical Investigation of a Wavy Ageing Interface", Colloids & Surfaces A: Physicochem. Eng. Aspects, 270-271, 2005, pp. 176-181.

Cyril Picard, et al., "Dilational Rheology of an Air-Water Interface Functionalized by Biomolecules: the role of Surface Diffusion", Rheologica Acta, 45, 2006, pp. 497-504.

J. Bieschke, et al., "Ultrasensitive Detection of Pathological Prion Protein Aggregates by Dual-Color Scanning for Intensely Fluorescent Targets", PNAS, vol. 97, No. 10, May 9, 2000, pp. 5468-5473.

A. Ramos, et al., "Conical Points in Liquid-Liquid Interfaces Subjected to Electric Fields", Physics Letters A, 184, 1994, pp. 268-272.

Jay Shendure, et al., "Accurate Multiplex Polony Sequencing of an Evolved Bacterial Genome", Accurate Multiplex Polony Sequencing of an Evolved Bacterial Genome, Science, vol. 309, Sep. 9, 2005, pp. 1728-1732.

M. A. Spaid, et al., "Stability of Viscoelastic Dynamic Contact Lines: An Experimental Study", Phys. Fluids, vol. 9, No. 4, Apr. 1997, pp. 823-832.

Kian Sung, "Factors Influencing Liquid Breakup in Electrohydrodynamic Atomization", Journal of Applied Physics, vol. 96, No. 7, Oct. 1, 2004, pp. 3956-3961.

Geoffrey Taylor, et al., "Disintegration of Water Drops in an Electric Field", Proc. R. Soc. A , 280, 1964, pp. 383-397.

Masashi Watanabe, et al., "A Pumping Technique Using Eelctrohydrodynamic Flow Inside a Gel", IEEE Transactions on Dielectrics and Electrical Insulation, vol. 10, No. 1, Feb. 2003, pp. 181-185.

S. K. Wilson, et al., "The Rate of Spreading in Spin Coating", J. Fluid Mech. vol. 413, 2000, pp. 65-88.

Yi-Je Juang, "Electrokinetics-Based Micro Four-Roll Mill", Bio-MEMS/NEMS, Http://www.chbmeng.ohio-state.edu/facultypaqes/leeresearch/154RollMill.htm 2006, pp. 1-2.

Markus Zahn, "Electromagnetic Field Theory: a Problem Solving Approach", New-York, Wiley, 1979, 7 pages.

Zhao Zhan, et al., "Biochip for PCR Amplification in Silicon", $1^{st}$ Annual International IEEE-EMBS Special Topic Conference on Microtechnologies in Medicine & Biology, Proceedings (Cat. No. 00EX451). IEEE, 2000, pp. 25-28.

M. G. Pollack, et al., "Electrowetting-Based Actuation of Droplets for Integrated Microfluidics", Lab Chip, 2002, vol. 2, pp. 96-101.

Alfonso M. Ganan-Calvo, "Cone-Jet Analytical Extension of Taylor's Electrostatic Solution and the Asymptotic Universal Scaling Laws in Electrospraying", Physical Review Letters, The American Physical Society, vol. 79, No. 2, Jul. 14, 1997, pp. 217-220.

James Q. Feng, "Electrohydrodynamic behaviour of a drop subjected to a steady uniform electric field at finite electric Reynolds number", The Royal Society, vol. 455, 1999, pp. 2245-2269.

M. Vallet, et al., "Limiting phenomena for the spreading of water on polymer films by electrowetting" The European Physical Journal B, vol. 11, 1999, pp. 583-591.

Y. Fouillet, et al., "EWOD Digital Microfluidics for Lab on a Chip", Proceedings of ASME ICNMM2006 4th International Conference on Nanochannels, Microchannels and Minichannels, Paper No. ICNMM2006-96020, Jun. 19-21, 2006, pp. 1-10.

Anke Klingner, et al., "Self-excited oscillatory dynamics of capillary bridges in electric fields", Applied Physics Letters, vol. 82, No. 23, Jun. 9, 2003, pp. 4187-4189.

D J Laser, et al., "A review of micropumps", Journal of Micromechanics and Microengineering, vol. 14, 2004, pp. R35-R64.

T. B. Jones, et al., "Dielectrophoretic liquid actuation and nanodroplet formation", Journal of Applied Physics, vol. 89, No. 2, Jan. 15, 2001, pp. 1441-1448.

Manfred Eigen, "L'Énigme Des Prions", Pour La Science, No. 286, Aout 2001, pp. 86-91.

Lucette Bardet, "Ultracentrifugation", Toute reproduction sans autorizatin du Centre francais d'exploitation du droit de copie est strictement interdite. Techniques de l'Ingénieur, traité Analyse et Caractérisation. pp. 1 405-1-1 405-30, dated Jan. 7, 1997.

* cited by examiner

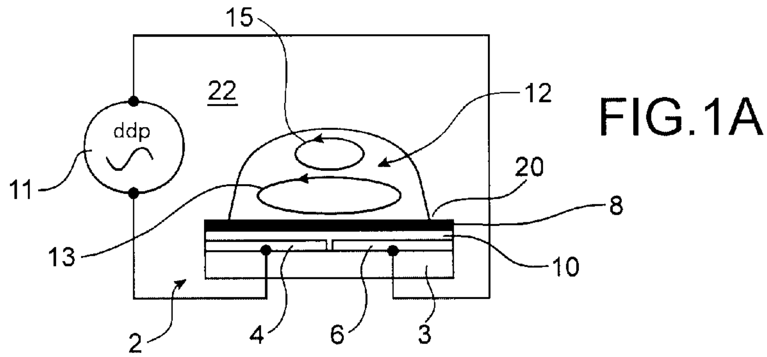
FIG.1A
FIG.1B
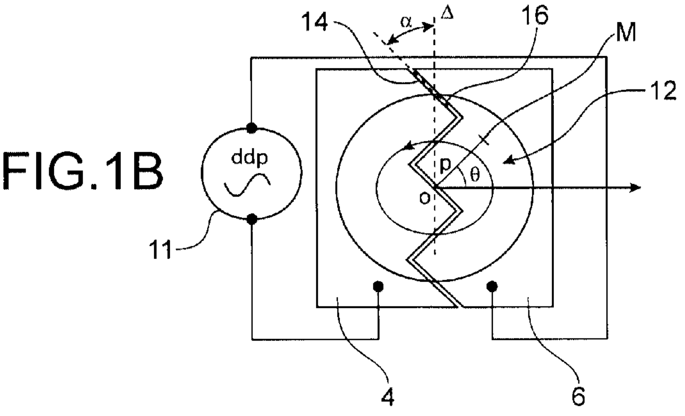
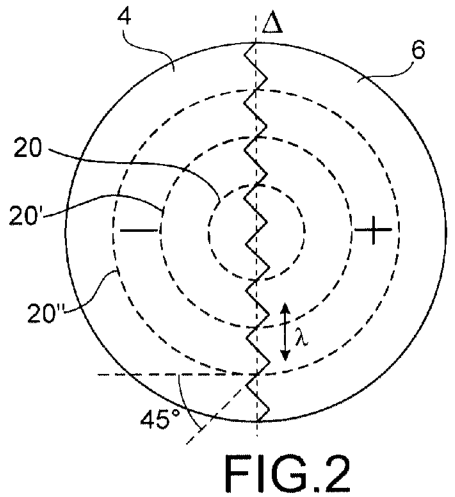
FIG.2
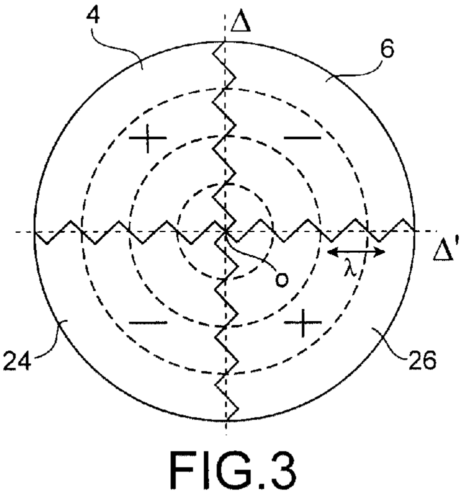
FIG.3

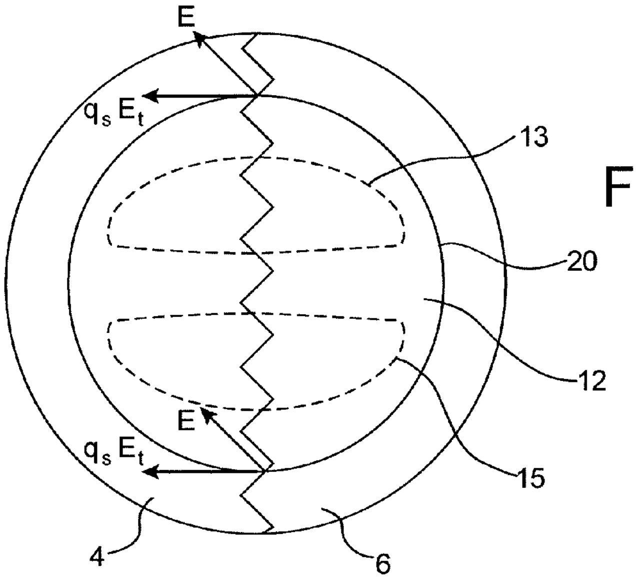
FIG. 4
FIG. 5
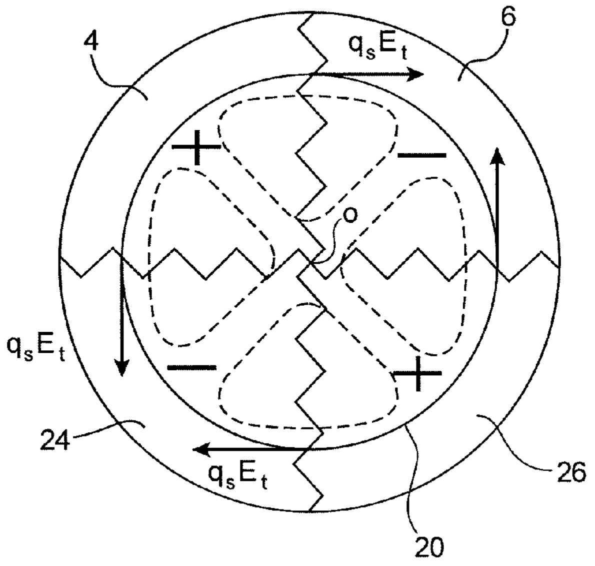
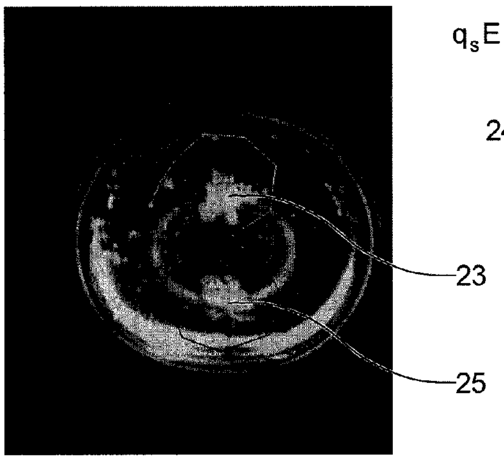
FIG. 6

MICRODEVICE FOR TREATING LIQUID SAMPLES

TECHNICAL FIELD AND PRIOR ART

The invention relates to the field of treatment of liquid samples, in particular by centrifugation or mixing of a liquid drop.

It notably applies to the preparation or to the purification of biological and chemical samples, to the fields of biomedical diagnosis, molecular biology, reprocessing of effluents, possibly radioactive effluents (extraction of actinides), and more generally to all scientific, technological and industrial fields which involve the selective extraction of macromolecules, organelles, actinides, colloids, or solid particles from a liquid sample appearing as a drop or a pool (liquid inclusions).

The proposed invention also relates to the field of discrete microfluidics, preferentially used instead of continuous microfluidics (in channels) from the moment when one gets rid of pumps, valves, walls required for confining the flow, etc.

Indeed, all these elements contribute to parietal physicochemical contaminations as well as to intrinsically slow capillary flows in spite of the strong power applied in the pumping (significant pressure losses).

Discrete (or digital) microfluidics play an increasing role in the development of novel microsystems such as labs-on-chips, and many analysis steps may be carried out in a chain with the help of discrete microfluidics.

Molecules of biological or medical interest are for example conveyed inside drops which pass in transit between various analysis steps such as biochemical functionalization, injection of biomolecules by heterogenous mixing (drop coalescence), pipetting or localized drop fragmentation, etc.

The proposed invention finds many applications in small scale mixing, small scale extraction, separation or purification by small scale centrifugation, concentration followed by detection of biological targets, microfluidic pumping, microfluidic transmission of movements, rheological characterization of fluid samples as liquid drops or as gels.

The invention also relates to the field of purification of biological samples and of extraction of biological constituents.

The most recognized purification techniques in biology are chromatography, electrophoresis and centrifugation; they are practiced in majority at a macroscopic scale (from a few centimeters to a few meters).

Coupled with performing detectors, chromatography is the most sensitive analysis technique which presently exists for assaying a substance in a biological sample.

This analysis technique is indeed one of the most sensitive but its miniaturization proves to be very delicate to apply in particular because of the porous medium which is applied; there lies its main drawback. The making of a microsystem integrating chromatography is uncertain and upstream preparation of the liquid sample remains pending.

With electrophoresis, selective separation of biological molecules may be obtained on the basis of their electric charge.

But miniaturization of electrophoresis remains delicate since the medium allowing migration of the constituents to be analyzed is a very viscous gel. The insertion and then the handling of a gel in an analysis chain of the lab-on-chip type are difficult to apply.

As regards present centrifuges, utilized in biology, biochemistry or in medical diagnosis for isolating constituents or purifying biological samples, they consist of an axis bearing a special rotor, the assembly being driven by a powerful motor. The rotor bears locations, located symmetrically on either side of the axis, which may receive small test tubes containing the biological preparations to be analyzed or purified. The assembly is enclosed in a tank, sealed during the rotation, for safety reasons.

The proposed invention is a solution to two problems posed by present centrifuges:

- the unbalance of the rotor that has to be continually compensated,
- and the difficulty of miniaturization since centrifugal acceleration is also proportional to the radius of gyration.

The document of Y. Fouillet et al., "EWOD digital microfluidics for a lab on a chip", Proceedings of the ASME, 4th Int. Conf. On Nanochannels, Microchannels and Minichannels, Jun. 19-21, 2006, Limerick, Ireland, illustrates a possibility of setting a fluid into motion by applying electrohydrodynamics (EHD). Electric forces are then used in order to generate tangential stresses of electrostatic origin on activated drops on a component of the electrowetting type.

In this type of device, the drop is fixed and the triple line does not move, while internal convection movements are observed.

The problem is posed of being able to optimize this phenomenon by means of a configuration of suitable electrodes and of applying this phenomenon for different applications on the other hand.

DISCUSSION OF THE INVENTION

The present invention uses the setting of a fluid into motion in a drop, which itself is at rest.

The propose invention applies to liquid inclusions, not in motion such as in electrowetting techniques, but at rest (in a static position). A liquid inclusion is centred on an EHD ("electrohydrodynamic") chip, also object of the invention. With the latter it is possible to generate an intense and organized movement or a mixing movement inside the drop and optionally on the outside, in the fluid external to the drop, for example if the latter and the EHD chip are covered with a viscous fluid, the drop being in a static position and not being deformed. In particular, there is no overall movement or any interfacial deformation of the liquid inclusion. A movement, or a displacement, before or after the mixing operation may occur in order to bring the drop or the liquid inclusion onto the mixing location or for moving it away therefrom after mixing.

The only movement is due to the interface of the drop and of the external medium; the particles which form this interface move tangentially to the latter so that it does not deform (there is a sweeping movement along the interface).

The geometry of the drop therefore remains fixed and the thereby generated movement along the interface is imparted to the internal fluid phases and optionally those external to the drop by the specific viscosities to each of these fluid phases. The viscosities act somewhat as a relay for the interfacial tangential pulse.

No electrophoretic gel or porous medium is applied; microfluidic miniaturization may therefore be obtained with the centrifugation according to the invention.

However, for microsystems, a problem lies in the G number $$\left(= \frac{u_\phi^2}{R} \middle/ g,\right.$$

a number which measures centrifugation relatively to weight or gravity, $u_\Phi$ being the centrifugation velocity) which has to be attained: at first sight, the smaller the length scale of the liquid sample (case of microsystems), the more it seems difficult to attain significant centrifugation intensities. With the present invention, this difficulty may be overcome and essentially all the advantages associated with centrifugation as an analysis technique, notably a biological technique, may be kept while allowing its miniaturization and the associated advantages:

- the handling of small biological samples,
- the implication of small volumes of reagents,
- the portability,
- and the implementation in a laboratory on a chip or a microsystem based on digital microfluidics.

These advantages are also retained if the matter is applying the invention to microfluidic concentration as a drop applied to the detection of biological targets.

A device according to the invention is a device for forming at least one circulating flow or vortex, at the surface of a drop of liquid, including at least two first electrodes forming a plane and having edges facing each other, such that the contact line of a drop deposited on the device and fixed relatively to the latter, has a tangent forming, when projected into the plane of the electrodes, an angle strictly comprised between 0° and 90° with the edges facing each other of the electrodes.

According to the invention, with the shape of the electrodes, it is possible to promote the existence of circulations of fluids, the contours facing the electrodes being neither totally tangent nor totally perpendicular to the triple line.

According to the invention, a tangential interfacial movement is induced by an electric field—in spite of the smallness of the liquid sample—by applying a tangential electric stress at the interface of a liquid sample, in the areas located above the interface areas of electrodes. The unique source of energy dissipation, from the moment when the liquid inclusion is stabilized in a static position by attachment of its triple line and/or by electrowetting, stems from bulk viscosity (there is no energy dissipation by triple line displacement). The close presence of a solid wall on which the liquid inclusion is deposited or else of two solid walls between which the inclusion is sandwiched (capillary bridge), generates a dissipative viscous shear which balances the interfacial driving term of electric origin.

The angle strictly comprised between 0° and 90°, between the tangent to the triple line (or its projection) and the edges facing each other of the electrodes, may advantageously be comprised between 40° and 50°, for example equal to substantially 45°.

The edges of the electrodes facing each other may for example be zigzag-shaped or have the shape of a logarithmic spiral.

The electrodes for example are 2, 4, or 8 in number.

Preferentially, the edges of the electrodes forming an angle strictly comprised between 0° and 90° with the projection of the contact line, alternate with edges of electrodes forming an angle of 90° with this same projection.

Means may be provided in order to activate or inactivate the electrodes successively. According to a particular embodiment, this successive activation and deactivation over time occurs at a high frequency above 100 Hz.

Separation spaces of the edges of the electrodes facing each other may alternately (by covering the electrodes in their plane, either clockwise or anti-clockwise) have a first value and a second value smaller than the first.

Means for trapping the triple line which a drop laid on the device defines with the latter, may further be provided.

A second set of electrodes may be located opposite, parallel to the first electrodes. For example, this second set of electrodes itself also forms a device according to the invention.

It is therefore possible to use two EHD chips at the lower and upper ends of a capillary bridge.

A device according to the invention may further include a tip-shaped counter-electrode.

With the invention, it is also possible to make a pumping device including at least one device according to the invention, as described above, and means for bringing a second fluid into contact with a drop of liquid positioned on the device.

Such a device may include a plurality of devices according to the invention.

With the invention, it is therefore possible to achieve micropumping of secondary flows or else acceleration of microfluidic flows by placing one (or more) microgear(s) consisting of one (or more) liquid inclusion(s) surrounded by a secondary and continuous liquid phase. In applications of the "micropumping" type, the present invention is distinguished by the use of a fluid interface which causes initiation of a tangential movement of interfacial origin. The thereby obtained flow rate is considerably superior to most of the present micropumps and accidental physicochemical contamination due to the presence of walls is avoided.

With the proposed invention, it is further possible to make apparatuses such as a mini-mixer, or an analytical mini-centrifuge, or a mini-emulsifier, or a microcentrifuge, or a mini-rheometer. With a mini-rheometer, it is possible to measure viscosity and elasticity by measuring or viewing flow velocity fields.

Among the advantages of producing according to the invention a flow with an interposed fluid interface and a network of electrodes, the following may be mentioned:

- it is not necessary that the fluid to be driven be an ionic fluid (unlike electrokinetic micropumps): in the proposed invention, the driving mechanism is a viscous shear of interfacial and dielectric origin,
- in the proposed invention, a flow may be pumped regardless of whether there are thermal, chemical or ionic gradients,
- one or two horizontal walls are sufficient (to be compared with mechanical, piezoelectric or electro-kinetic micropumps) and the sources of physicochemical contamination are highly reduced.

The proposed invention further has the following advantages:

- a non-destructive and isothermal character: the involved liquid inclusion may therefore contain fragile constituents, temperature-denaturable or under the effect of ionic forces,
- rapidity: with the invention, a few seconds or minutes are sufficient in order that the mixing or centrifugation generates sedimentation or floatation of constituents,
- a large simplicity of application as well as a possibility of servo-control,
- the capability of generating within a liquid inclusion of a typically millimetric size an intense rotary or mixing movement. The G number attained in experiments carried out with still not optimum chips according to the invention, is of the order of 10 or 100,
- the chip as well as the detachment techniques applied at the apex of the liquid inclusion, proposed in the invention, allow constituents to be specifically selected after microfluidic concentration with view to extraction, analysis or post-detection.

The invention also relates to a method for forming at least one circulating flow or vortex in a liquid drop in a surrounding medium, having relatively to each other different dielectric properties, and/or different resistivities, including the following steps:

positioning the drop on or over at least two first electrodes, having edges facing each other, the projection of the circular contact line of the drop onto the plane containing the electrodes having a tangent forming with these electrode edges an angle strictly comprised between 0° and 90°, applying an electric field between both electrodes.

The applied field is oblique relatively to the liquid drop/surrounding medium interface.

The volume of the drop may vary over time.

One or more circulating flows or a single or several vortices may be generated in the drop.

The invention also relates to a microfluidic concentration method by mixing or centrifugating a drop of liquid, notably for detecting antibodies or antigens, or proteins or protein complexes, or DNAs or RNAs, including the application of a method for forming at least one circulating flow or vortex in said liquid drop in accordance with a method according to the invention.

A detection step may be carried out, after mixing or centrifugation, without displacing the drop.

A step for extracting liquid from the drop may moreover be provided. Subsequently, it is possible to transfer the extracted liquid towards a detection area. The extraction step may be achieved by electrowetting or by emitting droplets from a Taylor cone.

The invention also relates to the formation of a microemulsion including:

a step for bringing closer two volumes of liquids intended to form the emulsion by displacing them relatively to each other, for example by electrowetting, a step for applying a method according to the invention, as described above.

A method for pumping a secondary fluid according to the invention by a drop of a primary fluid, includes the application of a method for forming at least one circulating flow or vortex in said primary fluid drop according to a method as described above, and the pumping of the secondary fluid by contact with the primary fluid, the forces present at the primary fluid/secondary fluid interface providing the drive for the secondary fluid.

A method for extracting an analyte from a drop of liquid according to the invention includes:

the application of a microfluidic concentration method according to the invention, deactivation of the (at least) two first electrodes, and formation of a capillary bridge between the first isolating surface and a wall including at least one other electrode, electric activation of the first electrodes and of the other electrode and cutting of the capillary bridge.

A method for extracting particles according to the invention includes the application of a method according to the invention as described above, the surrounding medium consisting of a second liquid containing particles which have settled beforehand on the interface of both liquids, and then separation, for example by electrowetting, of the side portions containing the particles, and of a central portion of the drop.

SHORT DESCRIPTION OF THE FIGURES

FIGS. 1A and 1B illustrate a geometry of the EHD system in the case of electrodes activated by an alternating electric potential difference.

FIG. 2 illustrates an EHD chip having two electrodes with segmented boundaries.

FIGS. 3 and 5 each illustrate an EHD chip having four electrodes with segmented boundaries.

FIG. 4 illustrates an EHD chip having two electrodes with segmented boundaries.

FIG. 6 illustrates a drop of water laid on an EHD chip having two segmented electrodes at ±45°.

Figure 7:
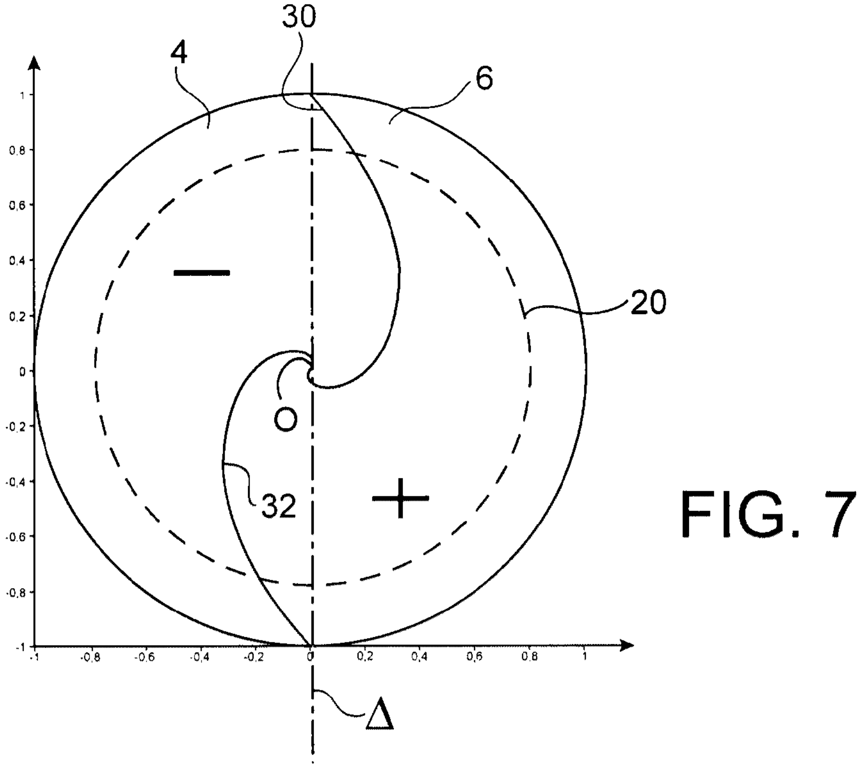
Figure 8:
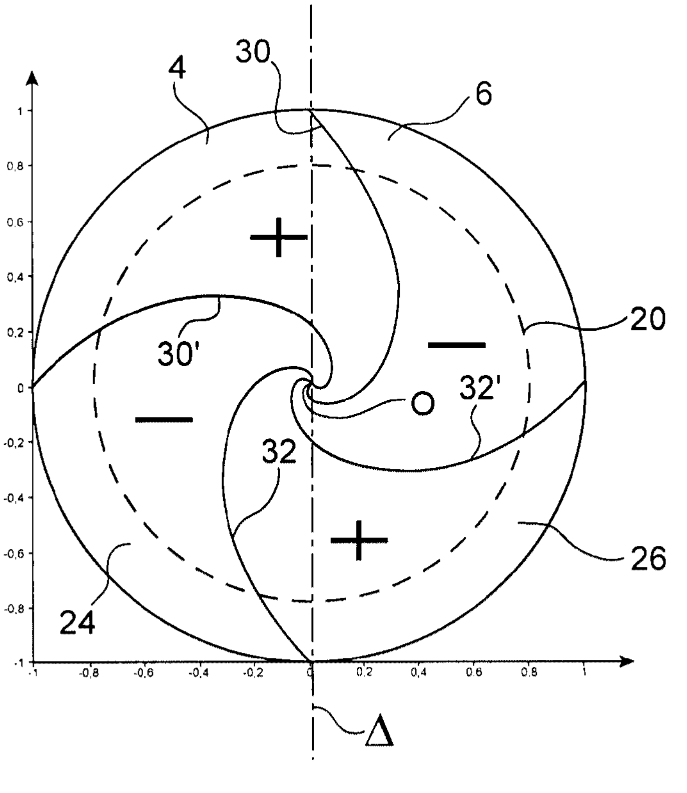
Figure 9:
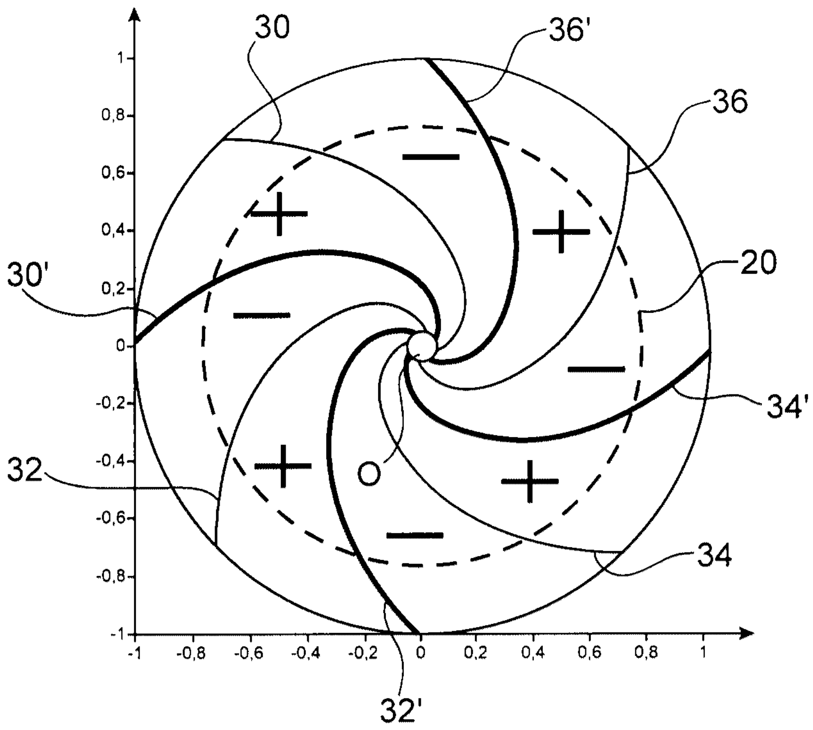

FIGS. 7-9 each illustrate an EHD chip with electrodes, the internal boundaries of which are logarithmic spirals.

Figure 10:
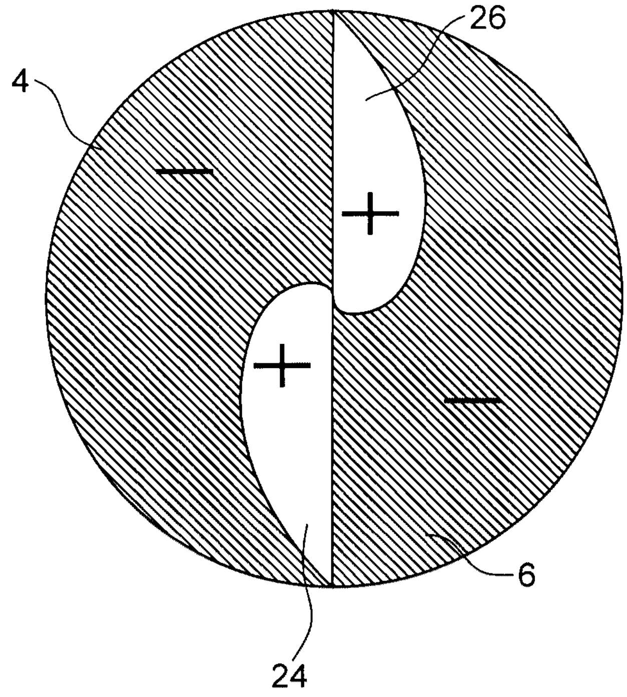
Figure 11:
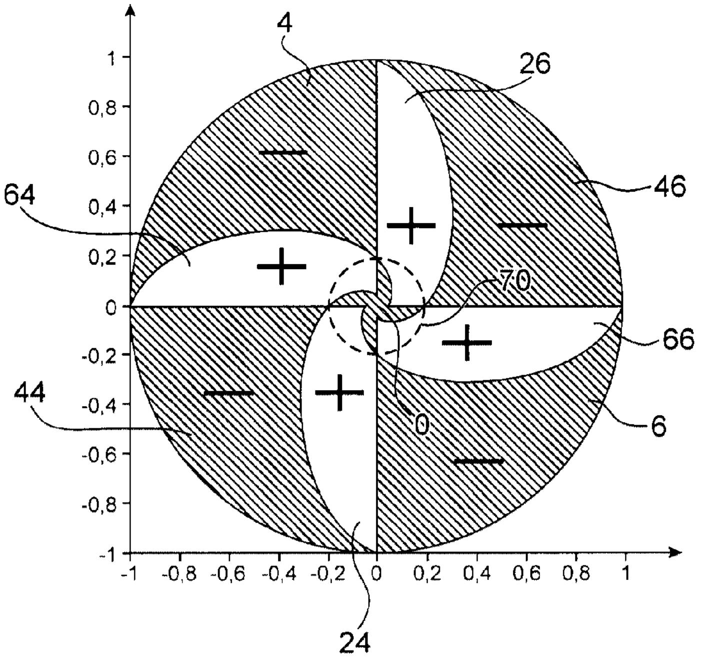

FIGS. 10 and 11 each represent an EHD chip with electrodes, the internal boundaries of which are either straight segments or logarithmic spirals.

Figure 12A:
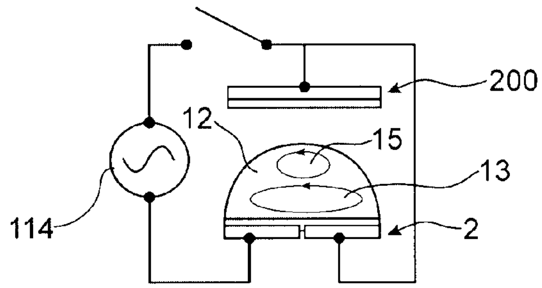
Figure 12B:
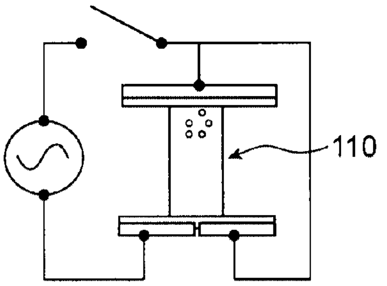
Figure 12C:
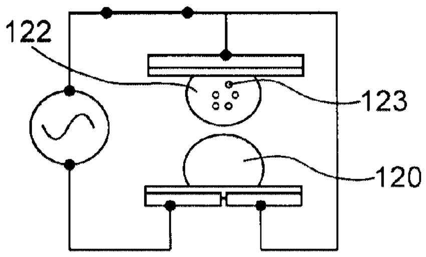

FIGS. 12A-12C illustrate vertical extraction steps by means of a method according to the invention.

Figure 13:
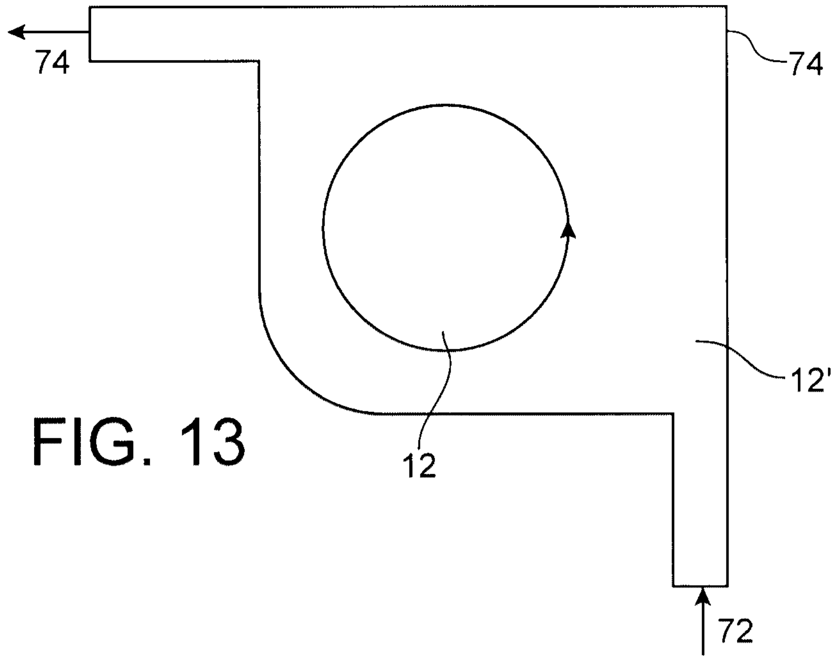
Figure 14:
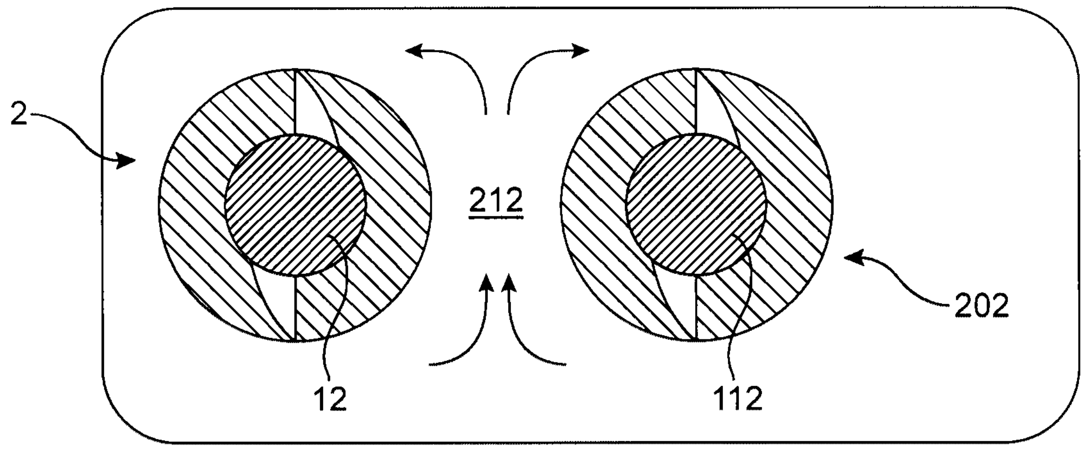

FIGS. 13 and 14 each illustrate an application of a device according to the invention.

FIGS. 15A-15D illustrate extraction steps of another method according to the invention.

Figure 16A:
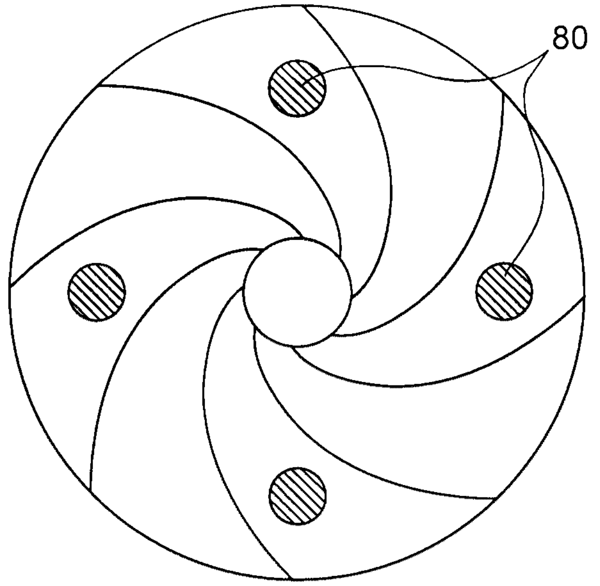
Figure 16B:
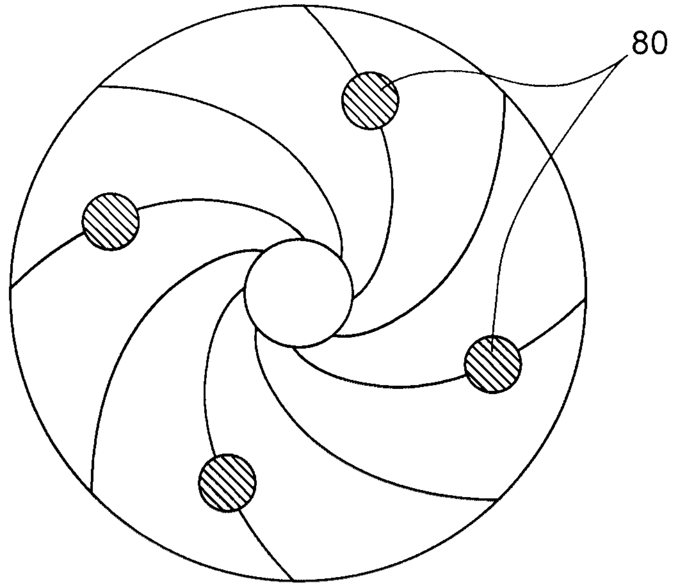

FIGS. 16A and 16B each illustrate a device according to the invention, provided with trapping pads.

DETAILED DISCUSSION OF PARTICULAR EMBODIMENTS

In the following discussion, all potential species which are the object of the present invention (macromolecules, organelles, actinides, colloids or solid particles) will be designated by the generic term of constituents.

The invention may notably apply cross-linked liquid inclusions, the size of which may for example vary between 10 microns and one centimeter.

According to the invention, a liquid inclusion 12 is in a static position, placed symmetrically overlapping two electrodes 4, 6 (or more; in an even or odd number), which may be set to different electric DC or AC potentials (FIGS. 1A, 1B). These for example are electric potentials of the same absolute value but of opposite signs. These electrodes rest on a substrate 3.

In order to be compatible with electrowetting displacement technology (EWOD technology), the drop may be separated from the electrodes by an insulating layer 10 and possibly by a hydrophobic layer 8. But the device may also operate according to the invention without these layers 8, 10, continuously or alternately.

The liquid—layer 8 (or layer 10)—ambient medium 22 contact line 20 is called a triple line. This contact line with a circular shape (but not necessarily) does not deform, which is a significant contribution, as regards the performances of mixing or centrifugation.

Means 11 make it possible to apply a potential difference between the two electrodes 4, 6, which gives rise to an oblique electric field relatively to the liquid 12/liquid 22 or liquid 12/gas 22 interface. This oblique field, i.e. neither totally tangent nor totally normal to the surface of the liquid inclusion 12, will allow electric charges to build up at the interface, and the momentum to be generated tangentially to the 12/22 interface, a momentum which will in turn drive currents 13, 15 internal to the drop, but not displace the actual drop. These currents appear in the plane of FIG. 1A for the sake of clarity, but they are rather oriented in a plane parallel to the plane of the electrodes 4, 6 or of the layers 8, 10. The obliqueness of the field results from the shape of the edges of electrodes facing each other, as explained later on. Between the inter-electrode space areas, the field is quasi zero.

An EHD chip according to the invention allows mixing or centrifugation not via physical displacement of a drop by electrowetting, but by the emergence of movements 13, 15 in the fluid internal to the drop and possibly in the fluid external to the drop. These movements are generated by viscous friction tangential to the surface of the relevant inclusion.

The only movement is due to the interface; the particles which form the interface move tangentially to the latter so that it does not deform (a sweeping movement along the interface).

Therefore with the invention, microflow 13, 15 or drainage, or mixing (or stirring) with controlled intensity, or centrifugation, may be produced inside liquid inclusions 12 by means of electrohydrodynamics (EHD).

As explained later on, it is possible to generate a single vortex, in other words a single centrifugation. This will be particularly interesting for targeted applications such as preparation of biological samples, purification of samples or further extraction of constituents (such as macro-molecules (DNA, RNA, proteins, etc.), analytes, colloids, solid particles, etc.).

The nature, the thickness, the technological application of layers 8, 10 are for example similar to those of EWOD technology, as described for example in the article of Y. Fouillet et al. cited above or else in document WO 2006/005880 or FR 2 841 063.

The invention operates with various pairs of fluids 12/22 such as water/air, water/oil, water/chloroform pairs, etc. The ambient medium 22 preferably is rather insulating (air, oil . . . ).

The drop 12 and the ambient medium 22 (gas or liquid) have different dielectric and resistive properties: different dielectric permittivities and/or different electrical conductivities; as an example, water/air or water/oil pairs may be mentioned, the dielectric permittivity and/or electrical conductivity properties of which have the desired differences. For example, with the water/oil pair or the water/air pair, the jump in permittivity and conductivity is fully sufficient because water is very strongly polarized (relative permittivity of 80).

When a voltage is applied between the two electrodes 4, 6, spreading of the drop 12 is observed in a first phase because of the presence of forces related to electrowetting.

For a given AC or DC voltage, the drop spreads out and its shape no longer changes. This voltage may for example vary from 0.1 V to 100 V or to a few hundred V, for example 500 V.

By electrowetting, the drop is maintained centred or overlapping above the different electrodes. Holding pads may thereby be used as explained later on.

At the drop 12/medium 22 interface, there is a vector identity between the jump in viscous stresses and the jump in tangential electric stresses. This identity expresses equilibrium, at any point of the interface, an equilibrium which has three components, projected along the unit vector n normal to the interface and along two unit vectors tangent to this interface, $t_1$ and $t_2$.

The component normal to the interface (also called normal momentum balance) contributes to positioning the inclusion in a stable way.

Mixing or centrifugation notably result from the tangential components of the previous equilibrium (tangential momentum balances) and more particularly from the tangential component along the tangent $t_1$ to the contact line 20 of the relevant liquid inclusion 12.

The nature and the intensity of the mixing resulting from the internal currents 13, 15 may be controlled by driving the level of vorticity, the number and the size of the micro-vortex(ices) or mini-vortex(ices) generated within the liquid inclusion.

Re-circulating flows (or vortices) may therefore be generated in controlled number and intensity in and around a liquid inclusion 12 deposited in a fixed position on an electrohydrodynamic chip. The liquid inclusion is not deformed during the process.

Mixing according to the invention by electrohydrodynamics, was observed under the microscope (FIG. 6) with a drop 12 of water under air and with selective tracer (30 mm diameter) beads of the interface (density: 0.3). The drop is laid symmetrically overlapping two electrodes 4, 6 insulated from the drop of water by a thin dielectric film 10 (diagram of FIG. 1A).

In the experiments conducted in air, the tangential component at the origin of the fluid movement is simplified because the air 22 around the drop is considered to be neutral in a first approximation; this component is explicitly written at the interface as, $$\varepsilon^{water} E_r E_\phi = \eta^{water}\left(r\frac{\partial}{\partial r}\left(\frac{u_\phi}{r}\right)\right). \tag{1}$$

The geometry of the drop of water 12 is close to a truncated sphere, the normal n is oriented along the radial coordinate r, the tangents $t_1$ and $t_2$ are oriented along the longitude Φ and co-latitude θ, respectively. The dielectric permittivity $\in^{water}$, as well as the dynamic viscosity $\eta^{water}$ in the drop of water 12, are much larger than their equivalents in air 22 around the drop. The mixing movement symbolized by the azimuthal component of the velocity, $u_\Phi$, always remains tangential to the surface of the liquid inclusion and therefore neither generates its displacement nor its interfacial deformation.

According to (1), the electric stress tangential to the interface is written as:

$$\tau_{r\Phi} = \in^{water} E_r E_\Phi, \tag{2}$$

This stress is the mixing drive in the fluids internal and external to the drop or to the liquid inclusion; it is proportional to the product of the two main components of the electric field at the interface in the vicinity of the contact line: the normal and tangential components, $E_r$ and $E_\Phi$ respectively. Therefore, for an electric field $E=E_r n+E_\Phi t_1$ available between the electrodes 4, 6, the mixing or centrifugation drive will be maximized if there is identity between the two involved components: $E_r=E_\Phi=E/\sqrt{2}$. It is therefore preferable to select an angle close to 45° between the boundary outlined by the inter-electrode spaces 14, 16 and the tangent $t_1$ to the circular contact line (or the projection onto the plane of the electrodes of this contact line).

According to an embodiment of the electrodes, the latter are separated from each other by an electrically insulating contour 16 with a zigzag shape: the segments alternate at about 45° for a drop of water, as illustrated in FIG. 1B, 2 or 3.

The (spatial) periodicity of the alternation, λ, may be optimized: preferably it will be assumed that:

$$R/10 < \lambda < R,$$

$$\text{Wherein } R = \text{radius of the drop} \tag{3}$$

Typically, R may vary for example between 0.1 mm and 10 mm.

λ may therefore be comprised between 0.01 mm and 1 mm for example.

More generally, as indicated in FIG. 1B, let α be the angle formed between the normal to the triple line 20 (contained in the so-called wetting plane) or its projection onto the plane of the electrodes, and the edges 14, 16 of the electrodes. The absolute value of α is strictly comprised between 0° and 90°. An optimum configuration corresponds to an angle close to 45°.

As described below, this constraint on the angle is compatible with electrode edges having shapes such as for example a zigzag or spiral shape.

An envelope calculation allows the angular constraint α to be taken into account and leads to electrode boundaries 14, 16 with the shape of a logarithmic spiral (or an equiangle spiral). The median line which separates the electrodes in their plane, or in the plane of the EHD chip, is described in polar coordinates by:

$$\rho = a \cdot \exp\left(\frac{\theta}{\tan\alpha}\right),$$

wherein the symbol a is a homothetic scale factor.

In FIG. 1B, a point M with polar coordinates ρ and θ is illustrated in a plane parallel to the plane defined by the electrodes 4, 6.

In the case of a drop of water surrounded by air (or by vacuum) and laid on an EHD chip optimized in this way, it may be shown that the optimum angle α is close to ±45° (FIGS. 2, 3).

In the particular case when the number of electrodes is even, the drop is positioned overlapping the electrodes. Locally, i.e. for two close electrodes, it is laid on either side of a direction Δ around which the electrode edges (zigzag or spiral) oscillate, or which represents an average position of the electrode edges (cf. direction Δ in FIGS. 1B, 2, 7, but also the directions α and Δ in FIG. 3).

A possible instability of the static position of the liquid inclusion 12 may be countered by means of an electric field which rotates sufficiently fast (at more than 100 Hz), obtained by successive activations and deactivation of the electrodes 4, 6 with which the sample interacts. Indeed, the liquid sample is then subjected to a driving electric stress which sweeps its periphery (the successive applications of a stress of electrical origin in the inter-electrode spaces, distributed along the triple line, may be modelled by a mobile stress which sweeps the interface in the vicinity of the triple line). If, therefore, the activation and deactivation rates are sufficiently fast, in other words if the contacters used for applying a rotating field are capable of operating at high frequency (>100 Hz), two advantages come to light:

the number of G is increased, the static disequilibrium of the liquid sample under the effect of electrowetting may be inhibited from the moment when the period of rotation of the electric field is much smaller than the time scale associated with the interfacial deformation generated by electrowetting.

The invention may be used for a stable volume 12, but also in the following various situations:

the liquid inclusions 12, object of mixing or of centrifugation, have a non-constant volume (diameters varying from 100 μm to 10 mm), the drop 12 retracts or grows under the effect of a phase transition (an interfacial mass transfer: evaporation/liquefaction), after centrifugation, it may be useful to pick up a volume fraction of the liquid sample in order to purify the latter (extraction of a pellet or of a supernatant), for extracting chemical constituents or analytes, etc. In this case, there is retraction of the drop after extraction.

The invention therefore remains efficient if the volume of the liquid sample 12 is random or else if it changes over time under the effect of one or more extractions or else under the effect of evaporation for example.

The invention allows easy integration inside a laboratory on a chip or a microsystem based on the displacement of liquid inclusions. Extraction techniques are proposed in the invention, which may, for example, apply means for displacing drops by electrowetting, of the EWOD type, such as described for example in WO 2006/005880 or in the article of M. G. Pollack et al. “Electrowetting based actuation of droplets for integrated microfluidics”, Lab Chip, 2002, Vol. 2, p. 96-101.

The G number which may be obtained with the invention as a centrifuge may be evaluated. According to the expression of the driving electric stress (2), a typical order of magnitude of the velocity field for a drop of water in air, is written as:

$$u_\phi \sim \frac{\varepsilon^{water} E^2}{2\eta^{water}} \delta. \tag{4}$$

If the thickness of the fluid, on which the momentum induced by the electric stress is dissipated, is designated by δ, we have:

$$\delta \sim \frac{2\eta^{water} u_\phi}{\varepsilon^{water} E^2}. \tag{5}$$

An inter-electrode space e equal to 20 μm may be considered. In experiments conducted under a microscope, the potential difference between two electrodes 4, 6 is typically set to 70 V. If the surface of the liquid inclusion is sufficiently distant from the inter-electrode space (thickness of the coating 8, 10 being very large with respect to e), the electric field lines emitted by two very close electrodes adopt an axisymmetrical geometry, and $$E(\rho) = \frac{V}{\pi\rho}, \tag{6}$$

wherein ρ designates the distance comprised between the median axis of the inter-electrode space and any point of the surface of the drop.

Let us consider the example of a millimetric drop of water (R=1 mm) characterized by a dynamic viscosity $\eta^{water}$ equal to $10^{-3}$ Pa as well as a relative dielectric permittivity of 78.5 (vacuum permittivity: 8.85 pF). Between the contact line (ρ=0.1 mm) and the apex of the drop (ρ=1 mm), the electric field is divided by a factor 10.

During viewings conducted by means of a CCD camera, a spun or remanent trace effect of the particles, corresponding to a complete rotation of the beads, corresponds to a closure time of the order of $\tilde{t} \approx 0.01$ s. Therefore, for the millimetric drop involved in the experiments, the order of magnitude of the velocity field is experimentally evaluated to be:

$$u_\phi \sim \frac{2\pi R}{\tilde{t}} \approx 0.6 \text{ m/s}.$$

Finally, according to (5) and (6), the typical length scale over which the induced momentum diffuses under the effect of viscosity (or the skin thickness set into motion) varies between $\delta$=0.35 mm in the vicinity of the contact line and $\delta$=3.5 mm at the apex of the drop.

The G number $$\left(=\frac{u_\phi^2}{R}\Big/ g,\right.$$

an expression already defined above) generated with two electrodes may vary between 1 for a viscous gel and 100 for water. This is notably the case for a liquid sample which has a relative dielectric permittivity equivalent to that of water (high).

The nature and the intensity of the fluid movement may be controlled with several parameters. Several applications may thereby be achieved, from mixing to centrifugation.

A first control parameter is the number of electrodes.

With two mutually facing electrodes 4, 6 (as in FIG. 1B or 2), two sources of driving electric stresses are available and are opposed in their effects as to the direction of the induced momentum.

Two co-rotary re-circulations may therefore arise, as illustrated in FIG. 4, described later on.

With four electrodes, for analogous physical reasons, four re-circulations are formed (FIG. 5).

The number of electrodes may be increased in order to produce a cascade of re-circulations and to thereby control an all the more rapid and effective mixing, in particular if this is mixing chemical or biochemical reagents. Increasing the number of electrodes causes an increase in the number of inter-electrode spaces and therefore in the number of areas in which an oblique field is produced, the driving force for mixing in the drop.

In this case, the net result in terms of providing momentum is increasing. This is notably the case for the chip with 8 electrodes of FIG. 11.

A second control parameter is the angle between the contact line and the boundaries of the electrodes.

Whether the number of electrodes is even or odd, when the goal is centrifugation, the question arises of how to possibly produce a single rotating flow. For this, a first possibility (FIG. 11) is based on controlled cancellation of the azimuthal component of the electric field, $E_\Phi$, so that locally, the driving stress $\tau_{r\Phi}=\in^{water}E_rE_\Phi$ cancels out (the contact line being locally orthogonal to the imposed electric field, $t_1 \perp E$). If the angle between the boundary of the electrodes and the normal to the contact line is alternately equal to 90° and to 45° (this is the case when the circle 70 of FIG. 11 is covered in one direction or in the other; this would also be the case in FIG. 10), then only the non-zero electric stresses all act in the same direction (FIGS. 10, 11). By changing the angle $\alpha$, the driving stress $\tau_{r\Phi}$ defined by (2) is changed, and therefore also the centrifugation intensity.

A second possibility is based on another control parameter, the inter-electrode spacing. In order to obtain a non-zero net result of all the imposed driving electric stresses around the drop at its surface, a wider inter-electrode spacing, typically by a factor 10, than the previous one or the next one, as described later on in connection with FIG. 9 may be imposed one time out of two.

From the above equations, the driving stress varies as the square of the imposed electric field which itself is proportional to the imposed potential difference and inversely proportional to the distance e separating the electrodes buried under the insulator film, and inversely proportional to the thickness of the dielectric and hydrophobic films 8, 10.

In FIGS. 2-5, the electrode boundaries are illustrated in a top view, as zigzag shapes, at 45° (cf. in particular FIG. 2 and the triple line 20") with the tangent to the triple 20 of the drop.

In FIGS. 2 and 3, the circles 20, 20', 20" in dotted lines illustrate the triple line 20 which delimits the wetting area between the liquid sample and the surface of the EHD chip. They illustrate the possible variability of the volumes of liquid samples 12, at various instants t, t+dt, t+n.dt (n>1). The electric potentials (−) and (+), applied to the various electrodes, are distinguished by their opposite signs. The symbol $\lambda$ represents the periodicity of the segmentation, each segment being tilted by ±45° (drop of water under air).

FIG. 2 is an example of an EHD chip according to the invention, having two electrodes 4, 6 with segmented boundaries, and FIG. 3 is an example of an EHD chip according to the invention having four electrodes 4, 6, 24, 26 with segmented boundaries.

In FIGS. 4 and 5, the circle (thick line) delimits the contact line 20 of the liquid sample 12. The symbols E, $E_t$ and $q_s$ respectively designate the electric field in the inter-electrode space, the component of this field tangential to the triple line and the accumulated electric charge at the surface of the fluid sample under the effect of the normal jump of the electric field and of the electric characteristics (conductivity, dielectric permittivity).

FIG. 4 is an example of an EHD chip according to the invention having two electrodes 4, 6 with segmented boundaries. Two co-rotary vortices 13, 16 (in dotted lines) are potentially generated.

In FIG. 5, an EHD chip according to the invention has four electrodes 4, 6, 24, 26 with segmented boundaries. Four co-rotary vortices (in dotted lines) are potentially generated.

FIG. 6 illustrates a drop of water 12 laid on an EHD chip 2, according to the invention, with two ±45° segmented electrodes (structure of FIG. 2). Hollow microbeads with an effective density, $\rho$=0.3, are used as tracers in the interface. At the centre of both vortices, the presence of two packets 23, 25 of microbeads agglomerated by the centripetal effect (FIG. 4) is actually found again.

As illustrated by this experiment, it is more generally possible to isolate beads, whether functionalized or not, at the core of the vortex at the surface of a drop of water subject to mixing according to the invention. The proposed invention may thereby be applied to the preparation of biological or medical samples, to the isolation of analytes for analyses purposes or for purification by microfluidic concentration at the core or else at the periphery of a single vortex or several vortices if dealing with more sophisticated mixing.

Further isolated constituents within a vortex may be extracted with the perspective of removing them, or of their subsequent biochemical characterization or detection.

Within the context of extracting constituents (extractants) from a donor liquid phase to a receiver liquid or gas phase, the proposed invention may make it possible to accelerate the interfacial transfer of extractants by producing a mixture in the donor liquid phase if the latter assumes the shape of a laid drop.

In FIGS. 7 and 8, chips according to the invention, respectively with two or four electrodes 4, 6, 24, 26 optimized in order to take into account the volume variability of the liquid samples, are illustrated: the internal boundaries 30, 30', 32, 32' of the electrodes are logarithmic spirals. The contact line 20 (in dotted lines) is circular. The electric potentials (−) (+) are distinguished by their opposite signs: to two neighbouring electrodes are applied opposite signs (except for an odd number of electrodes, for centrifugation, but this except for the rotating field).

The EHD chip of FIG. 9 has eight optimized electrodes in order to:

take into account the volume variability of the liquid samples: the internal boundaries 30, 30', 32, 32', 34, 34', 36, 36' of the electrodes are logarithmic spirals, and force the presence of a single vortex with the goal of centrifugation.

The thicker spirals 30', 32', 34', 36' are the sign of a wider separation gap of the electrode boundaries than that of the spirals 30, 32, 34, 36. The contact line 20 (in dotted lines) is circular. The electric potentials (−) and (+) are distinguished by the opposite signs of two neighbouring electrodes. The electrodes delimited by the electrode boundaries are alternately at a positive potential and at a negative potential.

Generally, the alternation of wider inter-electrode areas and less wide inter-electrode areas allows a significant reduction, in the wider areas, of the level of the electric stresses which would otherwise be opposed to the driving electric stresses generated by the least wide inter-electrode areas.

In FIGS. 10 and 11, the EHD chip respectively has four electrodes 4, 6, 24, 26 and 8 electrodes 4, 6, 24, 26, 44, 46, 64, 66 optimized in order to:

take into account the volume variability of liquid samples: the internal boundaries of the electrodes are alternately straight segments and logarithmic spirals, and force the presence of a single vortex with the goal of centrifugation.

The electric potentials (−) and (+) are distinguished by their opposite signs. The thicker circle suggests cutting out the electrodes in order to stabilize the contact line in a fixed position.

Indeed, each electrode brought to a certain potential may itself be subject to a local cut-out along a circular contour (segmented electrode). With this cut-out, it is possible to create artificial roughness facilitating the fixing of the contact line of the drop.

Moreover, the portion of the electrode located outside the contact line 20 may be deactivated, which may also lead to stabilization of the triple line by non-wetting.

In FIG. 11, the spirals, unlike those in FIG. 10, are extending towards the centre, which is expressed by a reverse centrifugation direction for the smallest liquid inclusions. The reversal boundary is symbolized by the circle 70 in dotted lines.

With the structures described above with FIGS. 10 and 11, the triple line may be trapped because of the circular cut-out of the electrodes. Alternatively, provision may also be made for circular rough patches or else micrometric pads vertically implanted around the triple line. This pad technique is moreover applicable to structures other than those of FIGS. 10 and 11, in particular to all the other structures of the device according to the invention, as explained in the present application.

Another interesting alternative consists of stabilizing the position of the liquid sample by means of a wettability difference localized at the triple line. For this, the idea is to allow the area which is external to the triple line to be hydrophobic (either by nature, or by coating it with a hydrophobic film) while the inner area is hydrophilic, either by nature or by EWOD activation, or by deposition of a hydrophilic film.

FIGS. 16A and 16B illustrate pads 80, for example in resin. Preferably, they are positioned as far as possible from the inter-electrode spaces, or in the inter-electrode spaces for which suppression of the component Et is desired; these are the wider inter-electrode spaces than their neighbours or else the inter-electrode spaces locally orthogonal to the triple line.

The pads 80 are for example made by photolithography of a thick resin layer (for example with a thickness comprised between 10 μm and 100 μm).

In the case of FIG. 16A, with the pads 80, it is possible to centre the drop at the centre of the spiral automatically.

In the case of FIG. 16B, they allow automatic centering of the drop at the centre of the spiral, and each is placed overlapping both electrodes where the electrohydrodynamic stress is locally suppressed.

By trapping the triple line, it is possible to ensure equilibrium of the contact line 20 and to avoid any effect which may perturb the cohesion of the liquid sample 12 to be analyzed or treated. It also provides reinforcement of the stability of the static position of the drop 12.

A chip according to the invention may be made with known technologies, for example as described in the document of Fouillet et al., 2006, already cited in the introduction of the present application or in document WO 2006/005880 or FR 2 841 063.

In the embodiments applying more than two electrodes, the drop is centred on the intersection of the internal edges of the electrodes (point "O" in FIGS. 3, 5, 8-11). In the case of two electrodes with edges as logarithmic spirals (FIG. 7), the drop is centred on the intersection O of the two spirals.

Instead of considering a liquid inclusion laid on a single chip, it is possible to consider a liquid inclusion sandwiched between two chips bound to two superposed horizontal walls. As in the case when the number of electrodes is increased, the actuation capacities will be doubled. However interfacial electric stresses only induce momentum over a fluid thickness of a few millimeters. The viscous friction increases inversely proportional to the distance separating the two horizontal walls.

The invention may be applied in order to extract analytes concentrated at the apex of a liquid inclusion 12 under the effect of centrifugal or centripetal forces.

FIGS. 12*a*-12*c* illustrate an extraction in three steps with two superposed horizontal walls: the lower horizontal wall is equipped with an EHD chip 2 according to the invention (according to one of the embodiments described in the present application) and the upper horizontal wall is equipped with an electrode 200 which possibly is an EHD chip according to the invention.

The implementation steps are then the following:

i) centrifugation step on the lower horizontal wall equipped with the EHD chip 2 (FIG. 12*a*), by activation of this chip, and deactivation of the electrode of the upper wall. The result of this is a centrifugation in the liquid inclusion 12 laid on the chip, with generation of vortices 13, 15; with this first step, it is possible to promote concentration of constituents at the apex (supernatant) or at the bottom, on the perimeter of the liquid sample (pellet), depending on whether they are sensitive to centripetal or centrifugal forces, respectively.

ii) there is then electric inactivation on the lower wall 2, for a time interval leading to the formation of a capillary bridge 110 with the upper wall equipped with an electrode 200 which is deactivated (FIG. 12*b*); then there is relative dewetting at the lower wall 2;

iii) the previous step is followed by electrical reactivation of the EHD chip 2 and of the upper electrode 200 (FIG. 12*c*) for applying electrowetting and specific extraction of a supernatant 123 (in the upper drop 122) and of a pellet (lower drop 120). The capillary bridge 110 is cut (a technique described in A. Klingner et al., "Self Excited Oscillatory dynamics of capillary bridges in Electric Fields", Applied physics Letters, Vol. 82, 2003, p. 4187-4189) into two independent inclusions, each being linked to the lower and upper walls. Two situations may then occur: if the constituents 123 are less dense than the liquid of the sample, the upper inclusion contains the supernatant to be analyzed (case of FIG. 12*c*); and if the constituents 123 are denser than the liquid of the sample, it is the lower inclusion which contains the pellet to be analyzed.

The formation of a cone at the apex of a liquid inclusion under the effect of the convergence of the electric field lines is known from the following documents: Taylor, G. I., 1964, *Disintegration of water drops in an electric field*, Proc. R. Soc. A, 280, pp. 383-397; Ramos, A. & Castellanos, A., 1994, *Conical points in liquid-liquid interfaces subjected to electric fields*, Phys. Letters A, 184, pp. 268-272; Ganan-Calvo, A., 1997, *Cone-jet analytical extension of Taylor's electrostatic solution and the asymptotic universal scaling laws in electrospraying*, Phys. Rev. Letters, 79, 2, pp. 217-220. The emergence of a Taylor cone may also prove to be useful for extracting isolated analytes at the apex of a liquid sample following mixing or centrifugation according to the invention. In this case, the liquid sample is found laid on an EHD chip as proposed in the invention. At a sufficiently close distance, close to the associated capillary length, a tip-shaped counter-electrode is localized in the opposing wall, as explained in the articles cited above in the present paragraph.

The operation may take place in three steps.

The first step consists of centrifuging the liquid sample in order to cause microfluidic concentration of target constituents.

The second step consists of modifying this actuation for a short instant by setting all the electrodes of the lower chip to the same potential while the upper tip-shaped electrode is set at a very different potential.

As result of the elongation of the liquid sample and of the consecutive formation of a Taylor cone under the influence of the electric field lines, two scenarios may occur:

- either a capillary bridge is formed with the upper wall and in this case, destabilization of the capillary bridge may be facilitated by activating a wider area of electrodes at the upper wall; this therefore boils down to the previous technique,
- or there is ejection of one or more drops (electrospray, as explained in the articles of Taylor, Ramos and Ganan-Calvo cited above). In this case, either the constituents settle and are again found concentrated as a pellet in the residual lower drop, or else they float and are then contained in the drop(s) ejected by the Taylor cone. If these drops do not immediately coalesce (they have similar electric charge), their merging may be facilitated subsequently by electrowetting along the upper wall.

FIG. 13 illustrates a micropump which, for example, applies an EHD chip with four electrodes (as for example in FIG. 10; but another number of electrodes is possible).

Through a fluid inlet 72, a secondary fluid 12' may be entered into a cavity or a reactor 74 containing an EHD device according to the invention, here with four electrodes. The primary liquid inclusion undergoes treatment as already described above without any overall displacement. The surface forces set the secondary fluid 12' into motion by viscosity as described above, according to the invention.

A micropump according to the invention may be applied to a cooling method in microelectronics (for processors), or to dispensing small medicinal amounts (pharmacology, galenics), or to the micropropulsion of objects (in space exploration).

By means of the physical mechanism applied in the invention (electrohydrodynamics), the range of velocities allowing mixing is considerably widened as compared with conventional micropumps. With the invention, it is in particular possible to attain a velocity at least equal to 0.1 m/s or 1 m/s.

If (p) and (s) designate the primary 12 and secondary 12' fluids, the relationship (1) should be completed and written explicitly as:

$$[E_\phi]_i(\epsilon^p[E_r]_{p,i} - \epsilon^s[E_r]_{s,i}) = \eta^p\left[r\frac{\partial}{\partial r}\left(\frac{u_\phi}{r}\right)\right]_{p,i} - \eta^s\left[r\frac{\partial}{\partial r}\left(\frac{u_\phi}{r}\right)\right]_{s,i}, \tag{7}$$

The index i indicates that the amount is evaluated at the interface, on the primary fluid (p) or secondary fluid (s) side. Driving of the secondary fluid is therefore all the more efficient since its viscosity is low but however higher than that of the primary fluid ($\eta^p < \eta^s$).

It is further possible, starting with a first drop 12, to generate mixing or centrifugation in another drop by a viscous drive even if the latter has dielectric permittivity or electric conductivity similar to those of the continuous liquid phase making up the external medium. In particular, it is possible to create a microgear by means of a continuous liquid phase and of two drops at the very least. In such a microgear, the reduction or amplification ratio is programmable by acting on the ratios of viscosities or of diameters between the continuous liquid phase and the drops.

In FIG. 14 a microfluidic gear is illustrated involving for example two EHD chips 200, 202, preferably optimized (for example of the type with four electrodes: FIG. 10), with their respective liquid inclusions 12, 112, one with characteristics: diameter d1 and viscosity μ1, and the other one with characteristics: diameter d3 and viscosity μ3. More EHD chips and liquid inclusions may be applied. A secondary liquid phase 212, of viscosity μ2, flows between the primary liquid inclusions 12, 112 by means of the movements of the latter, one in the clockwise direction, the other one in the reverse direction.

This technique, applying the joint use of a continuous liquid phase 212 resting on several liquid samples 12, 112 each activated by a chip 2, 202 similar to those proposed in the invention, leads to an increase in the mixing or centrifugation intensity within the liquid samples. Flow is more intense on the outside like in the inside of the drops.

Analogously, it is possible to induce a movement from a primary fluid phase (p) to a tertiary fluid phase (t) via a viscous secondary phase (s). In this case, the tertiary fluid phase may be mixed or centrifuged, including if its dielectric permittivity does not allow the emergence of driving electric stresses at the interface which surrounds it (FIG. 14).

The primary phase for example is a liquid sample laid on a chip according to the present invention. Surrounded by a secondary liquid, a movement of electric origin is generated at the p/s interface which propagates within the secondary liquid via viscosity.

Therefore, at the s/t interface, two cases occur:

- either it is impossible to generate driving electric stresses therein and in which case the internal mixing created within the tertiary inclusion is of a purely viscous origin: (7) is simplified as, $$\eta^p\left[r\frac{\partial}{\partial r}\left(\frac{u_\phi}{r}\right)\right]_{p,i} = \eta^s\left[r\frac{\partial}{\partial r}\left(\frac{u_\phi}{r}\right)\right]_{s,i}.$$

- or it is possible to generate by means of driving electric stresses, internal mixing inside the tertiary liquid inclusion; in which case the latter is laid on an EHD chip and the internal mixing is generated not only via driving electric stresses but also by a viscous drive at the interface, because the flow of the secondary fluid is also due to the driving role of the primary liquid inclusion.

A device of the microgear type according to the invention may include a series of inclusions, each lying on an EHD chip and connected together via the secondary liquid; in this case, such a microfluidic microgear amplifying the internal and external flows to the inclusions is close to an amplification system. The secondary fluid and the fluid of each of the drops or inclusions have different dielectric permittivities and/or different electrical conductivities.

With this embodiment, applied sequentially, it is possible to attain a large G number within one of the liquid inclusions involved in the chain (FIG. 14). The viscosity ratios of the fluids, the diameter ratios of the different involved inclusions, the number and the level of the driving electric stresses applied to the different interfaces are as many parameters which are involved in global amplification of the flows and which may be adjusted in order to optimize the system.

With the present invention, it is therefore possible to generate a bulk movement within a sufficiently viscous liquid sample via one (or more) electric stresses exerted on its surface. If the liquid sample 12 is surrounded by another also viscous liquid 22, the momentum induced by the electrical surface stress diffuses not only into the liquid internal to the liquid sample 12 but also into the external fluid 22. It is therefore possible to drive a secondary fluid into motion by means of a primary fluid adopting the form:

either of one or more drops laid on one or more chips (FIG. 13 or 14), or of a capillary bridge trapped between two chips (FIGS. 12*a*-12*c*), The present invention may therefore be used for setting a secondary fluid into motion within the context of continuous microfluidics. A micropump according to the invention may include a single liquid inclusion embedded in a secondary fluid (FIG. 13), or else several liquid inclusions embedded in a secondary fluid (FIG. 14). The latter may be set into motion by a gear mechanism which may be described as a microfluidic gear with interfacial viscous friction.

Another embodiment of a method according to the invention includes the steps of:

centrifugation or microfluidic concentration, fragmentation or local detachment of a portion of the liquid inclusion in order to select and then handle or remove locally concentrated constituents at the end of the previous step (for example a supernatant concentrated by centripetal effect at the apex of a liquid inclusion).

Figure 15A:
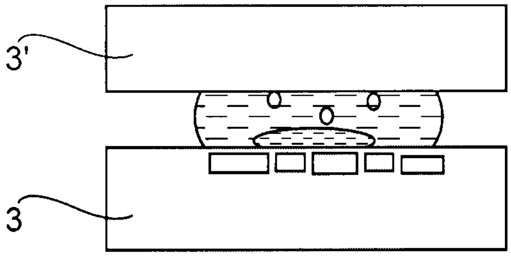
Figure 15B:
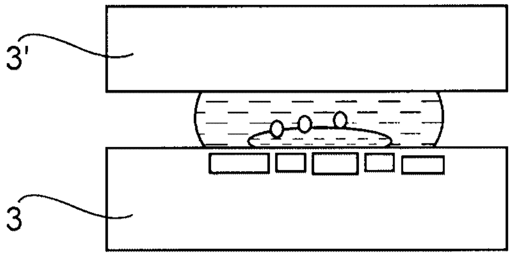
Figure 15C:
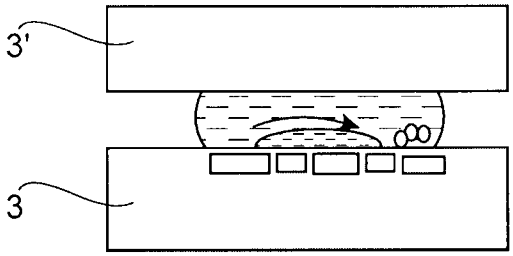
Figure 15D:
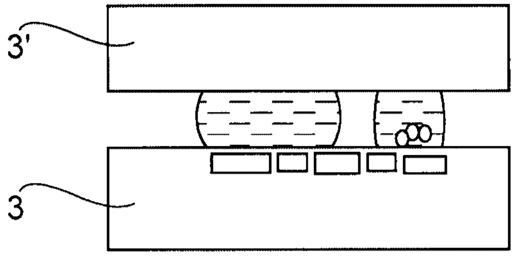

A particular embodiment of this method is illustrated in FIGS. 15A-15D. In these figures, the surrounding medium 22 consists of a second liquid, for example a second drop, nonmiscible with the first, containing particles 23. These particles 23 will gradually settle on the interface 12/22 (FIG. 15C). Setting this interface into motion, according to the invention, therefore by means of electrodes having the characteristics already described above, without displacement of the drop 12, causes a displacement of the particles 23 along the interface 12/22 and their grouping together on the edges of the drop 12.

Finally (FIG. 15D), the side portions containing the particles 23 are separated from the central portion of the drop 22, for example by cutting them by means of electrowetting, one or more of the electrodes located between the side portion(s) and the central electrodes being deactivated.

In FIGS. 15A-15D, both drops are illustrated between a substrate 3, on the one hand, on which a device according to the invention is formed and a confinement substrate 3', on the other hand.

Microscale rheological instrumentation is a sector of applications of the invention. Microrheometers based on electrokinetics are presently in a development phase (Juang, Yi-Je, 2006, *Electrokinetics-based Micro Four-Roll Mill*, http://www.chbmeng.ohio-state.edu/facultypages/leeresearch/154RollMill.htm).

The proposed invention which itself is based on electrodynamics, allows generation of four or two vortices for example within a liquid or gelled sample in order to obtain purely elongational or purely sheared flow. Viscoelastic parameter measurements may therefore be conducted with the invention by means of velocity measurements conducted for example by video acquisition.

A device according to the invention may be included in novel microsystems or laboratories on chips, with the purposes of preparing biological samples before other analysis steps.

Applications of the invention to this biological field will now be described.

Most known techniques for detecting biological targets have a significant drawback: all require purification beforehand and more generally prior preparation of the biological samples to be analyzed.

As regards the detection of pathogenic viruses by extraction of DNA segments, the standard technique is PCR; the latter consists in a process for amplifying DNA strands present within a liquid sample. PCR is currently developed in microsystems (Kopp-M U; de-Mello-A J; Manz-A, 1998, *Chemical amplification: continuous-flow PCR on a chip*, Science, 280, 5366, pp. 1046-1048; Zhan-Z; Dafu-C; Zhongyao-Y; Li-W. *Biochip for PCR amplification in silicon,* 2000, 1$^{st}$ Annual International IEEE-EMBS Special Topic Conference on Microtechnologies in Medicine and Biology. Proceedings (Cat. No. 00EX451). IEEE, Piscataway, N.J., USA, pp. 25-28). After a relatively large number of these thermal cycles, the DNA concentration is sufficient for allowing detection. Among the drawbacks of PCR, let us mention i) the duration associated with the amplification process, ii) the background noise related to the fact that the polymerase may amplify non-specific DNA segments present in the liquid sample, represents the second major drawback of PCR, and especially, iii) as for most detection techniques, PCR requires the preparation or purification of biological samples.

The ELISA test is another very widespread detection technique of the immunoanalysis type or of the type for determining viral load by assaying nucleic acids, intended for detecting and/or assaying an antigen present in a fluid biological sample. The ELISA test, practiced in a homogenous or heterogeneous phase, has the advantage of being fast and inexpensive. But there again, the biological samples have to be subject beforehand to a minimal purification step.

Among the techniques aimed at developing an alternative to PCR, detection without any amplification is found, a sensitive technique while allowing the detection time to be reduced. The principle of detection without amplification is based on the capture of target DNA segments, as little numerous as they are.

A first technique consists of hybridizing target DNA segments with functionalized paramagnetic nanobeads responsible for vectorizing these segments towards a functionalized solid interface for detection purposes. This concentration process may be based on a magnetic method, the target DNAs are eluted (by increasing the temperature beyond 50° C.) and will hybridize on the functionalized solid surface, before the detection phase (Marrazza, G., Chianella, I. and Mascini, M., 1999, *Disposable DNA electrochemical sensor for the hybridization detection*, Biosensors & Bioelectronics, 14, 1, pp. 43-51; Lenigk, R, Carles, M., Ip, N. Y. & Sucher, N J., 2001, *Surface characterization of a silicon-chip-based DNA microarray*, Langmuir, 17, 8, pp. 2497-2501). The concentration of the beads may also be accelerated by thermal Marangoni effect at the surface of a drop (Ginot, F., Achard, J-L., Drazek, L. & Pham, P., 12 Sep. 2001, Method and device for isolation and/or determination of an analyte; Patent Application FR 01 11883). These methods however come up against the problem of the non-specific adsorption of certain magnetic beads at solid walls. The attained sensitivity is not the one which was reckoned with.

The present invention allows hybridization kinetics to be accelerated while being compatible with a miniaturization constraint. It also allows functionalized beads to be concentrated by centrifugation for more sensitive detection. It is then applied in the way explained in document FR 01 11883.

Another possibility consists of hybridizing target DNA strands at a liquid/gas or liquid/liquid interface functionalized by probes (Picard, C. & Davoust, L., 2005, *Optical investigation of a wavy ageing interface*, Colloids & Surfaces A: Physichem. Eng. Aspects, 270-271, pp. 176-181; Picard, C. & Davoust, L., 2006, *Dilational rheology of an air-water interface functionalized by biomolecules: the role of surface diffusion*, Rheologica Acta, 45, pp. 1435-1528) and then of using, if necessary, a microfluidic concentration method for increasing the local densification of the target complexes/hybridized probes, and thereby allowing a more sensitive local detection (Berthier, J. & Davoust, L., 2003, Method of concentrating macromolecules or agglomerates of molecules or particles; Patent Application WO 2003/080209). A detection of the micromechanical type based on the modification of the rheological properties of the fluid interface during the hybridization process is also possible (Picard & Davoust, 2005, as mentioned above). This technique, like the previous ones, comes up against a difficulty of microintegration within a lab-on-chip and against the prior requirement of preparing the biological sample.

The present invention may be applied in two phases: it may be used for purifying/preparing a liquid biological sample and, then, be used an ultimate time by allowing concentration of the microfluidic type.

Indeed, by allowing centrifugation within a liquid sample 12 (FIG. 1A), with the invention, it is possible to locally and selectively concentrate complexes (analytes bound to receptors) in order to further increase the detection performances.

Therefore an application of the invention is notably microfluidic concentration by mixing or centrifuging in order to facilitate detection of antibodies, antigens, proteins or protein complexes, DNAs or RNAs. In this case, the fluids used are based on aqueous solution. The ambient medium may be air or pure oil. Detection may be directly conducted in situ at the concentration area or be subject to a subsequent step after extraction by selective detachment of said concentration area.

With the invention it is further possible to improve performances of PCR or PMCA with view to detecting DNAs or proteins. After the microfluidic concentration step, by means of a device according to the invention and in accordance with the centrifugation method according to the present invention, either applied to target DNA segments directly adsorbed at the functionalized interface of the liquid inclusion (a drop of aqueous solution) or to functionalized microbeads, it is possible to specifically sample the concentration area by electrowetting or by emitting droplets from a Taylor cone, as already explained above.

It is also possible to do without PCR and achieve ultrasensitive detection by applying several times in succession the EHD centrifugation according to the present invention to successively extracted liquid inclusions. Indeed, an EHD chip according to the invention may be optimized in order to take into account variability of sample volumes (for example by a chip having electrodes with the shape of a logarithmic spiral, as illustrated in FIGS. 7-11).

A microemulsion may also be made by promoting coalescence of two inclusions by displacing them by means of electrowetting and then by producing a mixture with the help of the present invention. PCR may then be conducted directly on the thereby obtained emulsion. The emulsion may also allow elimination of certain unnecessary constituents by adsorption at the interfaces with view to biological purification.

Another application example is the following. Two non-miscible liquid inclusions may merge with each other by the electrowetting technique, as described in the document of Y. Fouillet as already mentioned above. With the invention, it is then possible to generate a diphasic mixture such as a foam or an emulsion (microfoam, microemulsion), this in order to facilitate sequencing, or purification of biomolecules or else further extraction of colloids by capture at liquid/gas (foam) or liquid/liquid (emulsion) interfaces.

The invention claimed is:

1. A method for forming at least one circulating flow or vortex in a drop of liquid, or at its surface, in a surrounding medium, having relatively to each other different dielectric properties and/or different resistivities, comprising:

positioning the drop on a device including at least two first electrodes having edges facing each other, so that a projection of a contact line of the drop on a plane containing the at least two first electrodes has a tangent forming with these electrode edges an angle between 0° and 90°; and applying an electric potential difference between the at least two first electrodes which gives rise to an oblique electric field relative to an interface between the drop of liquid and the surrounding medium, a tangential component of the oblique electric field allowing electric charges to generate a momentum tangential to the interface and form the at least one circulating flow or vortex in the drop of liquid, and a normal electric field relative to the interface to keep in static position and a stable way the contact line of the drop of liquid during the method.

2. The method according to claim 1, wherein a volume of the drop varies as a function of time.

3. The method according to claim 1, wherein a single circulating flow or a single vortex is generated in the drop.

4. The method according to claim 1, further comprising: pumping a secondary fluid by a drop of primary fluid.

5. The method according to claim 1, further comprising: mixing or centrifuging a drop of liquid, for detecting antibodies, or antigens, or proteins or protein complexes, or DNAs or RNAs.

6. The method according to claim 5, further comprising carrying out a detection, after mixing or centrifuging, without displacement of the drop.

7. The method according to claim 6, further comprising extracting liquid from the drop.

8. The method according to claim 7, further comprising transferring extracted liquid towards a detection area.

9. The method according to claim 7, wherein the extracting is carried out by electrowetting or by emitting droplets from a Taylor cone.

10. A method for extracting an analyte from a drop of liquid comprising:

applying the method according to claim 5;

deactivating the at least two first electrodes, and forming a capillary bridge between a first insulating surface and a wall including at least a second electrode; and electrically activating the first electrodes and of the second electrode, and cutting of the capillary bridge.

11. A method for extracting particles comprising:

applying the method according to claim 1, the surrounding medium including a second liquid containing particles which have settled beforehand on an interface of the liquid drop and the second liquid; and separating side portions, containing the particles, and of a central portion of the drop.

12. The method according to claim 11, wherein the separating the side portions, containing the particles, and of the central portion of the drop, includes cutting by electrowetting.

13. A method for forming a microemulsion comprising:

bringing two volumes of liquids closer by displacing them relative to each other, and applying the method according to claim 1.

14. The method according to claim 13, wherein the bringing the two volumes of liquids closer is carried out by electrowetting.

* * * * *